J. R. GAMMETER.
METHOD OF VULCANIZING.
APPLICATION FILED APR. 18, 1917.

1,290,731.

Patented Jan. 7, 1919.
2 SHEETS—SHEET 1.

INVENTOR.
John R. Gammeter
BY Robert M. Pierson
ATTORNEY

J. R. GAMMETER.
METHOD OF VULCANIZING.
APPLICATION FILED APR. 18, 1917.

1,290,731.

Patented Jan. 7, 1919.
2 SHEETS—SHEET 2.

INVENTOR.
John R. Gammeter
BY Robert M. Pierson
ATTORNEY

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

METHOD OF VULCANIZING.

1,290,731. Specification of Letters Patent. Patented Jan. 7, 1919.

Application filed April 18, 1917. Serial No. 163,042.

*To all whom it may concern:*

Be it known that I, JOHN R. GAMMETER, a citizen of the United States, residing at Akron, in the county of Summit and State of Ohio, have invented certain new and useful Improvements in Methods of Vulcanizing, of which the following is a specification.

This invention relates to the art of vulcanizing rubber compounds, and especially goods such as rubber heels or rubber-and-fiber soles for footwear which are vulcanized in molds between the steam-heated plates of a press. The object of my invention is to provide a mode of operating multiple-compartment presses so that the capacity of both presses and operators may be materially increased.

Of the accompanying drawings.

Figure 1:
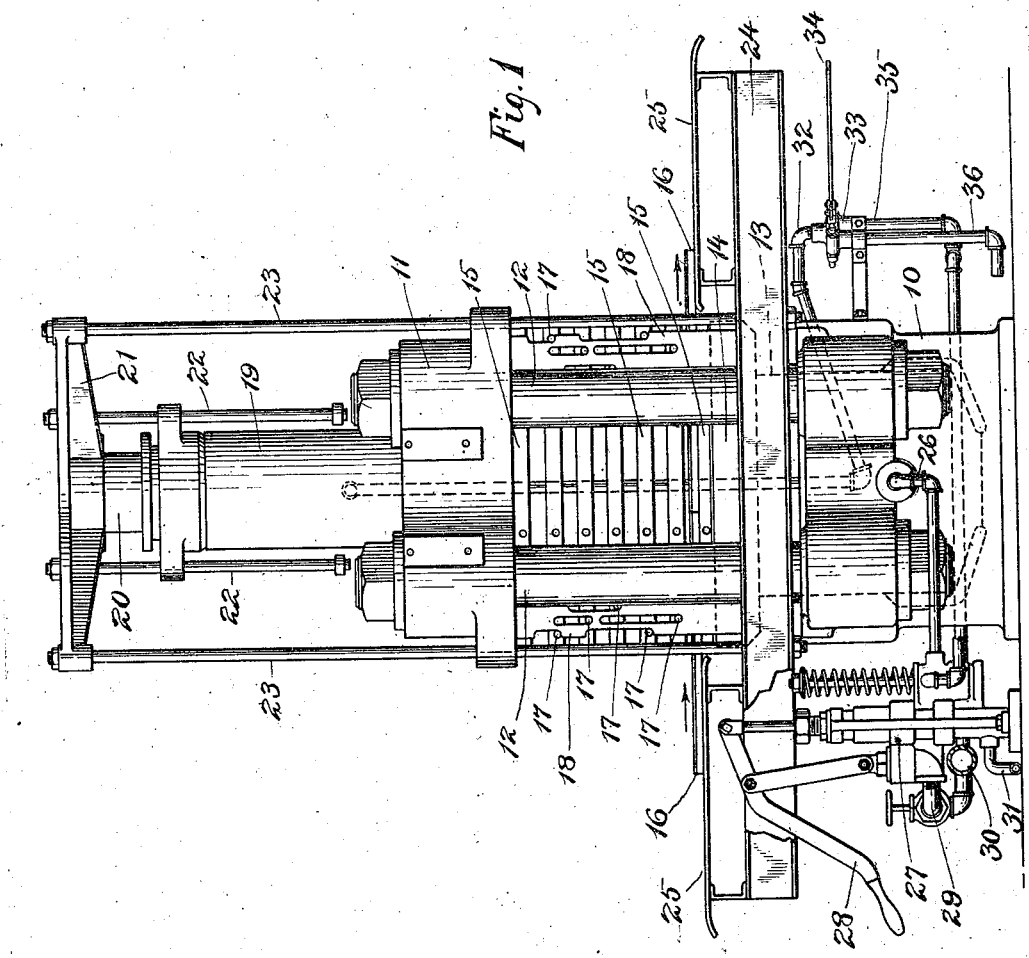
Figure 1 represents a side elevation of a six-compartment vulcanizing press of a type suitable for carrying out my novel method, there being shown in this and in Fig. 2 a mold whose contents have been vulcanized being pushed out of one of the compartments by a fresh mold.

The press here shown, which is selected merely for illustration and may be replaced by any other form of apparatus adapted to the purpose, includes a hydraulic cylinder 10 forming the base of the press, a stationary head or press platen 11 connected with bosses on the cylinder by large bolted tie-rods 12, a piston 13 working in the cylinder 10 and having a movable platen or plunger head 14 at its upper end, and a series of seven hot-plates 15 provided with suitable steam supply and discharge connections (not shown) for pressing and heating the vulcanizing molds 16. The upper one of these hot-plates is fixed to the stationary platen 11 and the lower one rests upon the movable platen 14. The intermediate hot-plates have a limited vertical movement for opening and closing the press and are arrested successively during the downward opening movement by means of pins 17 (four to each plate) engaging suitable stop abutments at the bottoms of slots and recesses formed in a set of vertical stop plates 18 as clearly shown in Fig. 1.

A second hydraulic cylinder 19 is mounted on top of the fixed platen 11, and contains a plunger or piston 20 whose upper end carries a four-arm yoke 21. The latter is provided with guide rods 22, and from the ends of its arms is suspended by means of rods 23 a rectangular frame 24 which carries a pair of platforms 25 located on opposite sides of the press.

26 is a pipe connecting the cylinder 10 with the casing of a controlling valve-device 27 which is operated by a hand-lever 28 to connect the cylinder 10 alternately with a branch 29 from a water pressure supply pipe 30 and with a discharge pipe 31, whereby the movable platen 14 may be raised and lowered. Cylinder 19 is connected by a pipe 32 with the casing of a valve mechanism 33, operated by a lever 34, and adapted to connect said pipe alternately with a branch 35 from the pressure supply pipe 30 and with a discharge pipe 36, these two valve mechanisms being located on opposite sides of the press so that each may be operated by one of the two attendants.

The method of operation involves the principle of overlapping curing periods and the replacement of a part only of the total number of molds at the end of each period. My invention requires the opening of the press and the relief of pressure upon every mold one or more times during its curing period, before the vulcanization is complete. This has heretofore been considered detrimental, but I have discovered and taken advantage of the fact that, in the present state of manufacturing and compounding knowledge, no harm whatever to the product results from interrupting the pressure on the uncured molds while fresh ones are being substituted for those whose contents have been completely vulcanized.

Figure 2:
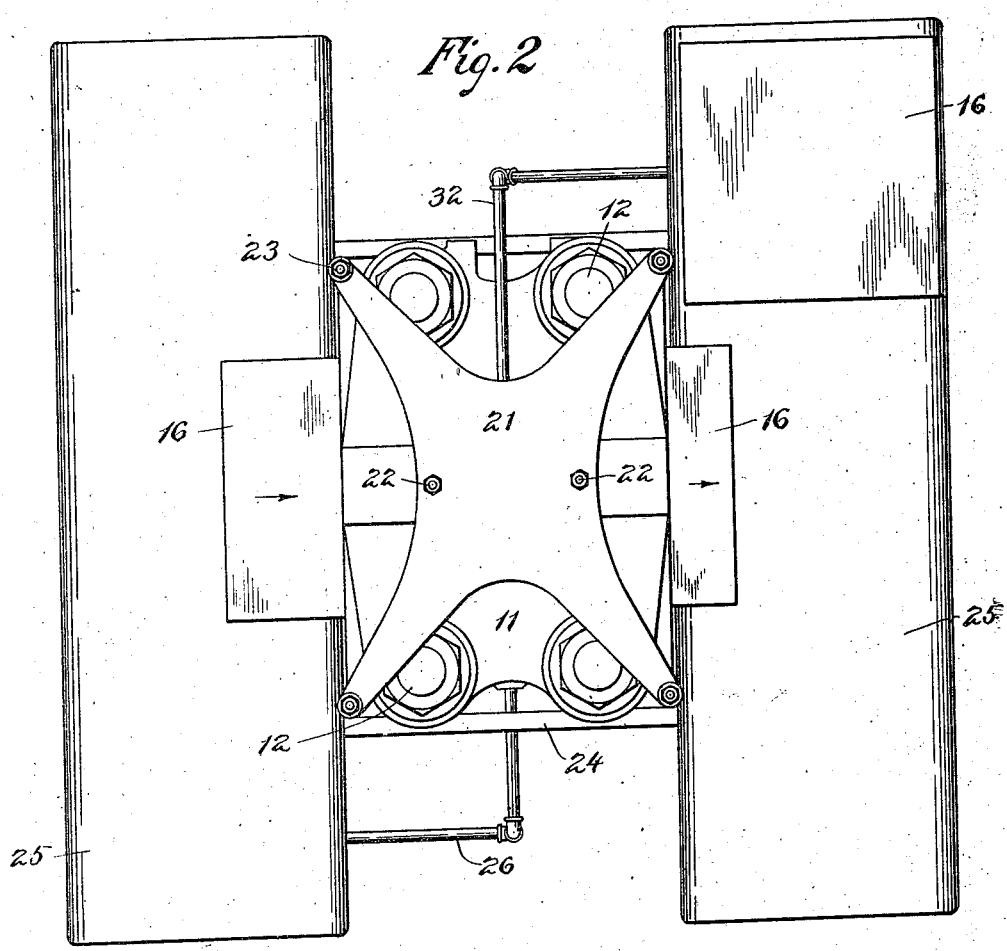
Fig. 2 represents a plan view of the press showing the two molds just referred to and also an additional mold on one of the platforms.
Figure 3:
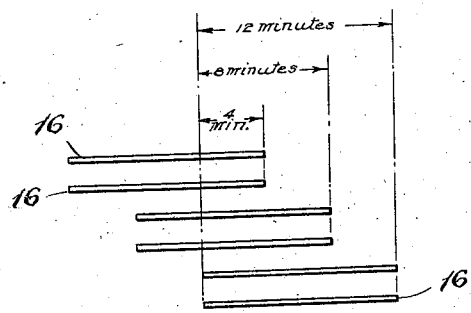
Fig. 3 represents a diagrammatic edge view of the six molds, illustrating graphically the method of timing the overlapping cures.

Let it be assumed that the proper curing period is twelve minutes, and that the six-compartment press is worked with three sets of two molds each, handled by two operators who stand at the long edges of the platforms on opposite sides of the press facing the tier of press plates and mold compartments. To open the press, the hand-lever 28 is worked to discharge the cylinder 10 and permit the movable platen 14 to drop to its lowest position as seen in Fig. 1. If all the compartments are empty, the operators will start a pair of molds 16 in the two uppermost compartments, for example. The molds to be inserted are carried on the platforms 25, which are moved to the proper level opposite each compartment by admitting water to or discharging it from the cylinder 19 by manipulation of the hand-lever 34. The press is then closed and the curing of these two molds is begun. Four minutes later it is opened and the second set of two molds is inserted in the next two compartments. The press is again closed so as to continue the curing under pressure of the first two molds and begin that of the second two. Four minutes later it is again opened and the third set of two molds inserted in the last two compartments. The press is again closed to continue the curing under pressure of the first and second sets and begin that of the third set of molds. Vulcanization of course proceeds in the hot molds contained in the press even when the latter is open. At the end of twelve minutes, a new cycle is begun by opening the press and removing the first two molds and substituting fresh ones. To do this, the platforms being opposite the top compartment, the operator on the right, for example, slides a fresh mold into that compartment and thereby pushes out the first cured mold, which is received by the operator on the left. He slides it to one side on his platform while the platforms are being lowered to the second compartment, and then inserts a fresh mold in the second compartment, thereby pushing out the first mold, which is received by the operator on the right, this being repeated at the end of each curing period. The substitution of molds is shown in progress with respect to the bottom compartment in Figs. 1 and 2, and the overlapping curing periods are represented graphically by the relative horizontal positions of the three pairs of molds in Fig. 3, the length of each mold being taken to represent 12 minutes. Fig. 3 is of course symbolic, the molds being actually alined in a vertical tier during vulcanization.

The full complement of molds for a six-compartment press worked according to this process is eight, six molds being in the press while two are being emptied and filled. During the periods of something less than four minutes each, while the press is closed, each of the two attendants can empty and fill one of the molds which has just been removed, the number of cavities in each mold and the number of sets of molds being so calculated that his time is fully occupied. In this way I obtain the maximum production of which the press and the operators are capable without fatiguing the latter and without requiring the cured molds to stand for a long time before being opened. The operators do not have to move about, or work in teams of more than two men, or handle the molds of any others than the one press, and the result of their work is easily checked for faults.

I claim:

1. The method of vulcanizing rubber articles which consists in intermittently pressing and continuously heating a series of molds containing the articles, in a succession of overlapped curing periods, and replacing with fresh molds the part of said series whose curing period is complete, during the successive intervals of release of pressure.

2. The method of vulcanizing rubber articles which consists in intermittently pressing and continuously heating a tier of molds, handling said molds in a succession of pairs whose curing periods are timed to overlap, and replacing with fresh molds, from opposite sides of the tier, the two molds of the pair whose period is complete, during the successive intervals of release of pressure.

In testimony whereof I have hereunto set my hand this 16th day of April 1917.

JOHN R. GAMMETER.